M. COMSTOCK.
Motors.

No. 138,737. Patented May 13, 1873.

Witnesses
N. C. Gridley
F. F. Warner

Inventor
Merlin Comstock

UNITED STATES PATENT OFFICE.

MERLIN COMSTOCK, OF CHICAGO, ILLINOIS.

IMPROVEMENT IN MOTORS.

Specification forming part of Letters Patent No. 138,737, dated May 13, 1873; application filed November 5, 1872.

*To all whom it may concern:*

Be it known that I, MERLIN COMSTOCK, of Chicago, in the county of Cook and State of Illinois, have invented certain new and useful Improvements in Motors, of which the following is a full, clear, and exact description which will enable others skilled in the art to which my invention appertains to make and use the same, reference being had in so doing to the accompanying drawing forming a part of this specification, and in which—

Figure 1:
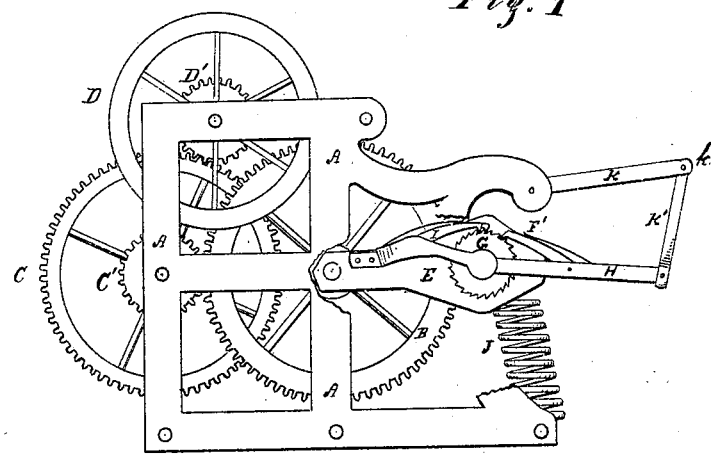
Figure 2:
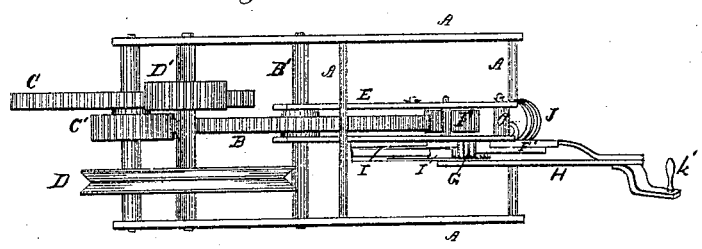

Figure 1 represents a side elevation of my improved motor, and in Fig. 2 a top view of the same.

Like letters of reference indicate like parts.

The object of my invention is to admit of an intermittent application of primary power, and develop a resultant or secondary power, which will cause the terminal or driving wheel to be rotated continuously in the same direction; and to that end it consists of the means hereinafter described and set forth, and employed for the purpose above referred to.

In the drawing, A represents the frame of the machine. B is a spur-wheel, and B' is its arbor, having bearings in the frame A. C is also a spur-wheel, having bearings in the frame A. C' is a pinion on the arbor of the wheel C. D is a belt or driving wheel, and D' is a pinion on the arbor of the wheel D, which arbor also has bearings in the frame A. All the wheels and pinions above described are rigidly attached to their arbors. The wheel B engages the pinion C', and the wheel C engages the pinion D'. It will be observed from the foregoing description that the gearing shown is the ordinary means heretofore employed for the purpose of increasing either power or speed—power by the application of it to the wheel D, and speed by the application of the power to the wheel B, as shown. E is a lever, through one end of which the arbor B' passes freely. F is a spur-wheel rigidly attached to a shaft having a bearing in the free end of the lever E. G is a ratchet rigidly attached to the shaft of the wheel F. H is a lever, through which the shaft of the wheel F passes freely, and F' is a push-pawl pivoted to the lever H and engaging the ratchet G. I I are hooks, also engaging the ratchet G, and pivoted to the lever E. J is a spiral spring, one end of which is attached to the free end of the lever E, and the other end to the frame A. The wheel F engages the wheel B.

It will be observed from the foregoing description that, by alternately raising and depressing the free end of the lever H, the wheel F will roll upward upon the wheel B, and be prevented from a backward rolling movement, by means of the hooks I I, during the downward movement of the lever H. The spring J now acts on the wheel B through the instrumentality of the lever E and wheel F, and as the latter wheel moves downward the former wheel is rotated. Before the force of the spring J is exhausted another upward movement of the lever H is made, and the rotation of the wheel B is thus made continuous. It will also be observed that when the resistance of either the wheel B or the wheel D is light a less force will be exerted by the spring J than when the resistance is great; in other words, the force exerted by the spring J is as the resistance. K is an arm pivoted to the frame A, and K' is an arm pivoted to the outer end of the lever H, and each of these arms are pivoted to each other, as shown at k. k' is a handle, by means of which the arms K and K', and the lever H, are conveniently operated.

I do not here intend to limit myself to the employment of the arms K and K' in connection with the lever H, as they may be either varied in their construction and arrangement, or not employed at all, as may be most convenient. Neither do I limit myself to the employment of the spring J for the purposes described, for the same result may be produced by weighting the free end of the lever E.

The motor is applicable to various uses; for example, in order to operate a sewing-machine, a belt is applied to the wheel D and carried to the operating-shaft of the machine; and the power may also be communicated to other machines and to light vehicles in a similar manner.

Having thus described my invention, what I claim as new, and desire to secure by Letters Patent, is—

1. The combination of the wheel B, lever E, wheel F, ratchet G, lever H, and one or more springs J, or its equivalent, in connection with a pushing-pawl and one or more stop catches or hooks, all arranged together substantially as and for the purposes specified.

2. The combination of the wheel B, lever E, wheel F, ratchet G, lever H, one or more springs J, or its equivalent, and arms K and K', in connection with a pushing-pawl and one or more stop catches or hooks, all arranged together, substantially as described.

MERLIN COMSTOCK.

Witnesses:
    F. F. WARNER,
    F. H. BROWN.